(12) United States Patent
Miyanaga

(10) Patent No.: US 11,766,608 B2
(45) Date of Patent: Sep. 26, 2023

(54) INFORMATION PROCESSING DEVICE, DATA SYNCHRONIZATION PROGRAM, DATA SYNCHRONIZATION METHOD, DATA SYNCHRONIZATION SYSTEM, AND TERMINAL DEVICE

(71) Applicant: SOFTGEAR CO., LTD., Tokyo (JP)

(72) Inventor: Naoki Miyanaga, Tokyo (JP)

(73) Assignee: SOFTGEAR CO., LTD., Tokyo (JP)

( * ) Notice: Subject to any disclaimer, the term of this patent is extended or adjusted under 35 U.S.C. 154(b) by 0 days.

(21) Appl. No.: 18/070,481

(22) Filed: Nov. 29, 2022

(65) Prior Publication Data

US 2023/0088340 A1 Mar. 23, 2023

Related U.S. Application Data

(63) Continuation of application No. PCT/JP2022/023717, filed on Jun. 14, 2022.

(30) Foreign Application Priority Data

Jun. 14, 2021 (JP) ................................ 2021-098419

(51) Int. Cl.
*A63F 13/31* (2014.01)
(52) U.S. Cl.
CPC ...... *A63F 13/31* (2014.09); *A63F 2300/5533* (2013.01)
(58) Field of Classification Search
CPC .. A63F 13/31; A63F 13/55; A63F 2300/5533; H04L 67/1095
See application file for complete search history.

(56) References Cited

U.S. PATENT DOCUMENTS

| 6,763,371 B1 | 7/2004 | Jandel |
| 9,386,051 B2 | 7/2016 | Hoshino et al. |

(Continued)

FOREIGN PATENT DOCUMENTS

| JP | 2007125250 A | 5/2007 |
| JP | 2007185446 A | 7/2007 |

(Continued)

OTHER PUBLICATIONS

Written Opinion of the International Searching Authority in International Application No. PCT/JP2022/023717, dated Aug. 9, 2022.

(Continued)

*Primary Examiner* — James S. McClellan
(74) *Attorney, Agent, or Firm* — HAUPTMAN HAM, LLP

(57) ABSTRACT

Provided are an information processing device, a data synchronization program, a data synchronization method, a data synchronization system, and a terminal device that suppress an increase in processing load and communication load in a situation in which a plurality of user terminals participate and data of the plurality of user terminals are synchronized. A server device is connected to a plurality of clients that synchronize an object with each other via a network, and includes: data reception means configured to receive a difference from a synchronization target object from a client having ownership of the object; data update means configured to update first, second, third replicas, and the like obtained by replicating the synchronization target object by using the difference; and data transmission means configured to transmit the difference to a client other than the client having the ownership among the plurality of clients.

20 Claims, 8 Drawing Sheets

(56) References Cited

U.S. PATENT DOCUMENTS

| | | | |
|---|---|---|---|
| 10,484,249 B1* | 11/2019 | Cheng | ................ H04L 67/1008 |
| 2014/0082077 A1 | 3/2014 | Hoshino et al. | |
| 2017/0197149 A1 | 7/2017 | Gutmann | |
| 2018/0018178 A1 | 1/2018 | Ma et al. | |
| 2018/0143995 A1* | 5/2018 | Bailey | ................ G06F 21/6218 |

FOREIGN PATENT DOCUMENTS

| | | | |
|---|---|---|---|
| JP | 200822573 | A | 1/2008 |
| JP | 201456546 | A | 3/2014 |
| KR | 1020050023495 | A | 3/2005 |
| KR | 1020180009352 | A | 1/2018 |
| WO | 0068864 | A1 | 11/2000 |

OTHER PUBLICATIONS

Office Action in JP Application No. 2021-098419, dated Aug. 10, 2021. 15pp.

Office Action in JP Application No. 2021-098419, dated Dec. 21, 2021. 17pp.

Search Report and Written Opinion of the International Searching Authority in International Application No. PCT/JP2022/023717, dated Aug. 9, 2022. 16pp.

Office Action in KR Application No. 10-2022-7043276 dated May 12, 2023. 14pp.

Office Action in KR Application No. 10-2023-7016620 dated Jun. 2, 2023. 8pp.

* cited by examiner

FIG. 3

| ROOM ID | R001 | | |
|---|---|---|---|
| USER ID | USER NAME | SOCKET ID | PARTICIPATION DATA AND TIME |
| U001 | Taro | S001 | 2021/1/1 10:05 |
| U002 | Jimi | S002 | 2021/1/1 11:00 |
| U003 | Bob | S003 | 2021/1/1 11:01 |
| ⋮ | ⋮ | ⋮ | ⋮ |

FIG. 4

| ROOM ID | R001 | | |
|---|---|---|---|
| REPLICA ID | OWNER | TRANSMISSION DESTINATION RULE | TRANSFER |
| A | U001 | USER OTHER THAN OWNER | OK |
| L | U001 | GROUP α OTHER THAN OWNER | NG |
| B | U002 | USER OTHER THAN OWNER WITHIN DISTANCE OF 50 | OK |
| ⋮ | ⋮ | ⋮ | ⋮ |

INFORMATION PROCESSING DEVICE, DATA SYNCHRONIZATION PROGRAM, DATA SYNCHRONIZATION METHOD, DATA SYNCHRONIZATION SYSTEM, AND TERMINAL DEVICE

CROSS-REFERENCE TO RELATED APPLICATIONS

The present application is a bypass continuation application based on and claims the benefit of priority from the prior Japanese patent application 2021-098419 filed on Jun. 14, 2021, and PCT Application No. PCT/JP2022/023717 filed Jun. 14, 2022, the entire contents of which are incorporated herein by reference.

TECHNICAL FIELD

One embodiment of the present invention relates to an information processing device, a data synchronization program, a data synchronization method, a data synchronization system, and a terminal device.

BACKGROUND ART

As a conventional technology, an information processing device that synchronizes a user object of a user terminal with a simulation target of a simulator has been proposed (see, for example, Patent Literature 1).

The information processing device disclosed in Patent Literature 1 is connected to an individual simulator that simulates a behavior of a predetermined simulation target and a user terminal that determines a behavior of a user object according to an instruction input from a user, the information processing device holds the user object and a copy of the simulation target, and the user terminal acquires simulation target information from the individual simulator via the information processing device for each synchronization timing determined based on a predetermined timing determination rule, predicts the behavior of the simulation target based on the latest acquired simulation target information at a time point other than the synchronization timing, and presents a result of the prediction to the user. With such a configuration, a processing load and a communication load are reduced.

CITATION LIST

Patent Literature

Patent Literature 1: JP 2007-185446 A

SUMMARY OF INVENTION

Technical Problem

However, the information processing device of Patent Literature 1 holds the user object and the copy of the simulation target, and transmits the copy of the simulation target included in a visual field range of the user object to the user terminal. Therefore, although the processing load and the communication load are reduced, the information processing device performs collision determination for the simulation target, and makes a notification to the corresponding simulator to cause the simulator to perform interaction. Therefore, a processing load for the determination is applied to the information processing device, and the user object and a copy of another simulation target are not transmitted to the simulator. Therefore, there is a problem that the information processing device cannot be directly applied to a situation in which data of a plurality of user terminals are synchronized in a configuration in which the plurality of user terminals participates.

Therefore, an object of the embodiments is to provide an information processing device, a data synchronization program, a data synchronization method, a data synchronization system, and a terminal device that suppress an increase in processing load and communication load in a situation in which a plurality of user terminals participate and data of the plurality of user terminals are synchronized.

Solution to Problem

In order to achieve the above-described object, aspects of the embodiments provide the following information processing device, data synchronization program, data synchronization method, data synchronization system, and terminal device.

Aspects of a first embodiment include an information processing device connected to a plurality of clients that synchronize an object with each other via a network, the information processing device including: reception means configured to receive change content information of a synchronization target object from the plurality of clients; update means configured to update, by referring to management information that is managed for each synchronization target object and defines a client having ownership of the synchronization target object, a replicated object obtained by replicating the synchronization target object by using the change content information in a case where a transmission source client is defined as the client having the ownership of the synchronization target object in the management information; and transmission means configured to transmit the change content information to a client other than the client having the ownership among the plurality of clients.

Aspects of a second embodiment include an information processing device connected to a plurality of clients that synchronize an object with each other via a network, the information processing device including: reception means configured to receive change content information of a synchronization target object from the plurality of clients; update means configured to update a replicated object obtained by replicating the synchronization target object by using the change content information; and transmission means configured to transmit, by referring to management information that is managed for each synchronization target object and defines a client having ownership of the synchronization target object, the change content information to a client other than the client having the ownership among the plurality of clients in a case where a transmission source client is defined as the client having the ownership of the synchronization target object in the management information.

Aspects of a third embodiment include the information processing device according to the first or the second embodiment, in which when a client participates in a virtual space in which the plurality of clients participates, the reception means receives the synchronization target object owned by the client and stores the synchronization target object as the replicated object in a recording medium.

Aspects of a fourth embodiment include the information processing device according to the first or the second embodiment, in which when the client generates a new object, the reception means replicates the newly generated object as the synchronization target object and stores the replicated object in a recording medium.

Aspects of a fifth embodiment include an information processing device according to the third or the fourth embodiment, in which when the client participates or when the client newly generates an object, the transmission means transmits the replicated object or the synchronization target object stored in a recording medium to a client other than the client having the ownership among the plurality of clients.

Aspects of a sixth embodiment include an information processing device according to any one of the first to the fifth embodiments, in which the reception means does not receive the change content information of the synchronization target object from a client other than the client having the ownership of the synchronization target object.

Aspects of a seventh embodiment include the information processing device according to any one of the first to the fifth embodiments, in which the update means does not update the replicated object in a case where the reception means receives the change content information of the synchronization target object from a client other than the client having the ownership of the synchronization target object.

Aspects of a eighth embodiment include the information processing device according to any one of the first to the fifth embodiments, in which in a case where the reception means receives the change content information of the synchronization target object from a client other than the client having the ownership of the synchronization target object, the transmission means does not transmit the change content information to the client having the ownership.

Aspects of a nineth embodiment include the information processing device according to any one of the first to the eighth embodiments, in which the update means receives a difference from the synchronization target object before change as the change content information of the synchronization target object and updates the replicated object.

Aspects of a tenth embodiment include the information processing device according to any one of the first to the nineth embodiments, further causing to function as management means configured to transfer the ownership of the replicated object corresponding to the synchronization target object owned by the client to another client based on a predetermined rule in a case where the transfer of the ownership is permitted when the client exits from the virtual space in which the plurality of clients participate.

Aspects of an eleventh embodiment include the information processing device according to any one of the first to the eighth embodiments, further causing to function as management means configured to delete the replicated object in a case where transfer of the ownership of the replicated object corresponding to the synchronization target object owned by the client is not permitted when the client exits from the virtual space in which the client participates, in which the transmission means instructs another client to delete an object corresponding to the replicated object held by the another client.

Aspects of a twelfth embodiment include a data synchronization program for causing a computer connected to a plurality of clients that synchronize an object with each other via a network to function as: reception means configured to receive change content information of a synchronization target object from the plurality of clients; update means configured to update, by referring to management information that is managed for each synchronization target object and defines a client having ownership of the synchronization target object, a replicated object obtained by replicating the synchronization target object by using the change content information in a case where a transmission source client is defined as the client having the ownership of the synchronization target object in the management information; and transmission means configured to transmit the change content information to a client other than the client having the ownership among the plurality of clients.

Aspects of a thirteenth embodiment include a data synchronization program for causing a computer connected to a plurality of clients that synchronize an object with each other via a network to function as: reception means configured to receive change content information of a synchronization target object from the plurality of clients; update means configured to update a replicated object obtained by replicating the synchronization target object by using the change content information; and transmission means configured to transmit, by referring to management information that is managed for each synchronization target object and defines a client having ownership of the synchronization target object, the change content information to a client other than the client having the ownership among the plurality of clients in a case where a transmission source client is defined as the client having the ownership of the synchronization target object in the management information.

Aspects of a fourteenth embodiment include a data synchronization method performed by an information processing device connected to a plurality of clients that synchronize an object with each other via a network, the data synchronization method including: receiving change content information of a synchronization target object from the plurality of clients; updating, by referring to management information that is managed for each synchronization target object and defines a client having ownership of the synchronization target object, a replicated object obtained by replicating the synchronization target object by using the change content information in a case where a transmission source client is defined as the client having the ownership of the synchronization target object in the management information; and transmitting the change content information to a client other than the client having the ownership among the plurality of clients.

Aspects of a fifteenth embodiment include a data synchronization method performed by an information processing device connected to a plurality of clients that synchronize an object with each other via a network, the data synchronization method including: receiving change content information of a synchronization target object from the plurality of clients; updating a replicated object obtained by replicating the synchronization target object by using the change content information; and transmitting, by referring to management information that is managed for each synchronization target object and defines a client having ownership of the synchronization target object, the change content information to a client other than the client having the ownership among the plurality of clients in a case where a transmission source client is defined as the client having the ownership of the synchronization target object in the management information.

Aspects of a sixteenth embodiment include a data synchronization system including: a plurality of clients that synchronize an object with each other; and an information processing device that is connected to the plurality of clients via a network and includes: reception means configured to receive change content information of a synchronization target object from the plurality of clients; update means configured to update, by referring to management information that is managed for each synchronization target object and defines a client having ownership of the synchronization target object, a replicated object obtained by replicating the synchronization target object by using the change content information in a case where a transmission source client is defined as the client having the ownership of the synchronization target object in the management information; and transmission means configured to transmit the change content information to a client other than the client having the ownership among the plurality of clients.

Aspects of a seventeenth embodiment include a data synchronization system including: a plurality of clients that synchronize an object with each other; and an information processing device that is connected to the plurality of clients via a network and includes: reception means configured to receive change content information of a synchronization target object from the plurality of clients; update means configured to update a replicated object obtained by replicating the synchronization target object by using the change content information; and transmission means configured to transmit, by referring to management information that is managed for each synchronization target object and defines a client having ownership of the synchronization target object, the change content information to a client other than the client having the ownership among the plurality of clients in a case where a transmission source client is defined as the client having the ownership of the synchronization target object in the management information.

Aspects of an eighteenth embodiment include the data synchronization system according to any one of the sixteenth to eighteenth embodiments, in which the plurality of clients transmit, to the information processing device, a difference from the synchronization target object before change as the change content information of the synchronization target object.

Aspects of a nineteenth embodiment include a terminal device as a client that synchronizes an object with another client via an information processing device and is communicably connected to the information processing device, the terminal device including: reception means configured to receive, by referring to management information that is managed for each synchronization target object and defines a client having ownership of the synchronization target object, change content information of a synchronization target object from the client having the ownership of the synchronization target object via the information processing device in a case where a transmission source client is defined as the client having the ownership of the synchronization target object in the management information; update means configured to update a replicated object obtained by replicating the synchronization target object by using the change content information; and transmission means configured to transmit the change content information to a client other than the client having the ownership among the plurality of clients.

Aspects of a twentieth embodiment include a terminal device as a client that synchronizes an object with another client via an information processing device and is communicably connected to the information processing device, the terminal device including: transmission means configured to transmit, by referring to management information that is managed for each synchronization target object and defines a client having ownership of the synchronization target object, change content information to the information processing device in a case where the own client is defined as the client having the ownership of the synchronization target object in the management information, when the replicated object obtained by replicating the synchronization target object is updated in the own client.

Aspects of a twenty-first embodiment include the terminal device as a client according to the nineteenth or twentieth embodiment, in which a difference from the synchronization target object before change is transmitted to the information processing device as the change content information of the synchronization target object.

Advantageous Effects of Invention

According to the first, second, twelfth to seventeenth, nineteenth and twelfth embodiments described above it is possible to suppress an increase in processing load and communication load in a situation in which a plurality of user terminals participates and data of the plurality of user terminals is synchronized.

According to third embodiment, when the client having the ownership of the synchronization target object participates, the synchronization target object can be replicated to generate the replicated object.

According to fourth embodiment, when the client having the ownership of the synchronization target object newly generates an object, the newly generated object can be replicated as the synchronization target object to generate the replicated object.

According to fifth embodiment, the replicated object generated when the client having the ownership participates or when the client having the ownership newly generates an object can be transmitted to a client other than the client having the ownership among the plurality of clients.

According to sixth embodiment, the change content information of the synchronization target object can be prevented from being received from a client other than the client having the ownership of the synchronization target object.

According to seventh embodiment, in a case where the change content information of the synchronization target object is received from a client other than the client having the ownership of the synchronization target object, the replicated object can be prevented from being updated.

According to eighth embodiment, in a case where the change content information of the synchronization target object is received from a client other than the client having the ownership of the synchronization target object and the replicated object is updated, the updated replicated object can be prevented from being transmitted to the client having the ownership.

According to nineth embodiment, it is possible to receive a difference from the synchronization target object before change as the change content information of the synchronization target object and update the replicated object.

According to tenth embodiment, it is possible to transfer the ownership of the replicated object corresponding to the synchronization target object owned by the client to another client based on a predetermined rule in a case where the transfer of the ownership is permitted when the client exits.

According to eleventh embodiment, it is possible to delete the replicated object in a case where transfer of the ownership of the replicated object corresponding to the synchronization target object owned by the client is not permitted when the client exits, and to instruct another client to delete an object corresponding to the replicated object held by the another client.

According to eighteenth embodiment, in a case where the replicated object of the synchronization target object owned by the client itself is received from the information processing device, the plurality of clients can refuse to receive the replicated object.

According to twenty-first embodiment, a difference from the synchronization target object before change can be transmitted to the information processing device as the change content information of the synchronization target object.

BRIEF DESCRIPTION OF DRAWINGS

FIG. 3 is a diagram illustrating a configuration of participant management information.

FIG. 4 is a diagram illustrating a configuration of replica management information.

EMBODIMENT

In a synchronization system in the present embodiment, a massively multiplayer online game (MMOG) in which a plurality of participants do an activity, for example, a plurality of participants play a game, in a common virtual space is executed.

In the MMOG, activities of participants are associated with each other as time passes in the virtual space. A plurality of virtual characters operated by the plurality of participants interact with each other, fight with each other, collect items, or the like as time passes. Then, by such an activity, the character obtains an owned item and earns or loses a numerical value related to a battle and an experience point related to an action.

In such a virtual space, in a client terminal, a state of a change of the activity over time due to the virtual character or item is synchronously displayed, and the participants can experience the same virtual space. In other words, it is necessary to synchronize an object existing in the game such as the virtual character and item between the clients.

That is, in an online game as the MMOG as described above and another network application such as a conference system, a technology of synchronizing content information such as a document and a moving image between terminals of participants is used. Here, as the number of participants or the number of contents (synchronization target objects) to be synchronized increases, the amount of data that is required to be synchronized increases, a synchronization delay (lag or latency) increases, and the use as the network application cannot be made.

In the world of a game such as the MMOG or a first-person shooter (FPS) game, synchronization delay is fatal and the game does not work in this case. Therefore, a method has been devised to reduce the number of synchronization target objects and the number of participants.

In order to reduce the number of synchronization target objects, a game design needs to be devised. In order to reduce the number of participants, a virtual space (room) to be shared is divided, or a plurality of the same virtual spaces (rooms) are prepared by setting a limitation on the number of participants. However, in this method, participants in different rooms cannot share the game experience. Therefore, in order to completely share the game experience, it is desirable to participate in the same room.

In a case where the limitation on the number of shared objects and participants that can be accommodated in a single room can be increased, the degree of freedom in game design and the game experience of the participants can be greatly improved. Hereinafter, a configuration of a synchronization system for increasing the number of shared objects and participants that can be accommodated in a single room and suppressing a synchronization delay will be described.

(Configuration of Synchronization System)

Figure 1:
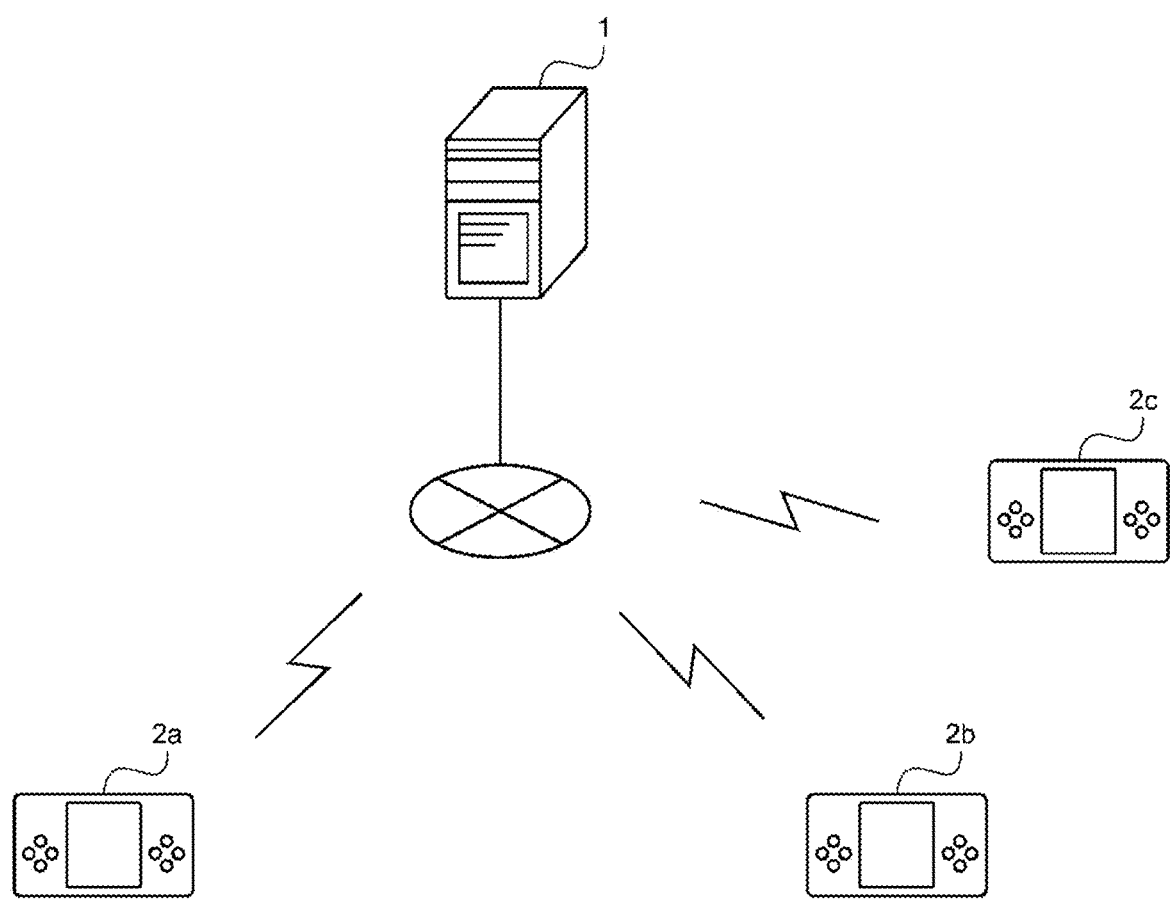
FIG. 1 is a schematic diagram illustrating an example of a configuration of a synchronization system according to an embodiment.

FIG. 1 is a schematic diagram illustrating an example of a configuration of the synchronization system according to an embodiment.

This synchronization management system is configured by connecting a server device 1 as an information processing device and terminal devices 2a, 2b, and 2c as clients in a mutually communicable manner via a network. The device and the network may be a cloud, a personal computer, a game terminal, a LAN, or the Internet, or may be a virtual machine, a virtual network, or the like.

The server device 1 is a server type information processing device which operates in response to a request from the terminal devices 2a, 2b, and 2c operated by operators, and includes, in a main body thereof, electronic components such as a central processing unit (CPU), a hard disk drive (HDD), a flash memory, a volatile memory, and a (wireless/wired) LAN board having functions for processing information. The server device 1 communicates with the terminal devices 2a, 2b, and 2c and transmits and receives data to synchronize data handled by the terminal devices 2a, 2b, and 2c, and is, for example, a game server or the like. Note that the server device 1 may be either configured with a plurality of clusters or configured to execute distributed processing. Alternatively, the server device 1 may be configured as a virtual machine may be configured as a virtual machine in a cloud environment.

The terminal devices 2a, 2b, and 2c are terminal-type information processing devices which operate based on a program, and each include, in a main body thereof, electronic components such as a CPU, a HDD, or a flash memory having functions for processing information. The terminal devices 2a, 2b, and 2c operate based on a program such as a massively multiplayer online game (MMOG), for example, sequentially output data as a result of the operation to the server device 1, and receive data as a result of the operation of another terminal from the server device 1 to frequently synchronize a game object between the terminal devices 2a, 2b, and 2c. Note that, although three terminal devices 2 are illustrated, the number of terminal devices may be one or two, or may be four or more. Preferably, a configuration in which communication is possible even in a case where about 1000 terminal devices are connected.

The network 4 is a communication network enabling high-speed communication, and is, for example, a wired or wireless communication network such as an intranet or a local area network (LAN).

As an example, the server device 1 and the terminal devices 2a, 2b, and 2c operate to synchronize information (synchronization target object) held as an object in each device with the progress of a game between the devices, hold a copy of the object in each device as a replica (replicated object), and assist a synchronization operation by transmitting and receiving (relaying) the replica in order to copy and hold (as a tertiary copy) the replica in each device while managing ownership of the replica. Note that the server device 1 does not actually perform the synchronization operation but performs relay, but the relay for synchronization may be referred to as "synchronization" in a broad sense, and this operation may be referred to as the "synchronization operation". More specifically, a content of the replica of the server device 1 is updated only by the update of the object in a terminal device of a user having the ownership, and the update of the object (tertiary copy) in a terminal device of another user not having the ownership is not performed. Hereinafter, details of a configuration and an operation when the server device 1 serves as a relay server to synchronize an object between the terminal devices 2*a*, 2*b*, and 2*c* will be specifically described in the embodiment.

In addition, terms such as "object", "class", "field", and "instance" used in the present embodiment are used synonymously with those used in the context of, for example, Java (registered trademark), C++, C#, Python, JavaScript (registered trademark), Ruby, or the like, but hereinafter, the class and the instantiated class (instance) may be collectively referred to as an "object". A "class" is a collection of processes for executing a program, and the class includes a method for executing the processes and a field as a variable used when the method executes the processes. An object has at least zero field, and each field has one or a plurality of field names and field values.

(Configuration of Server Device)

Figure 2:
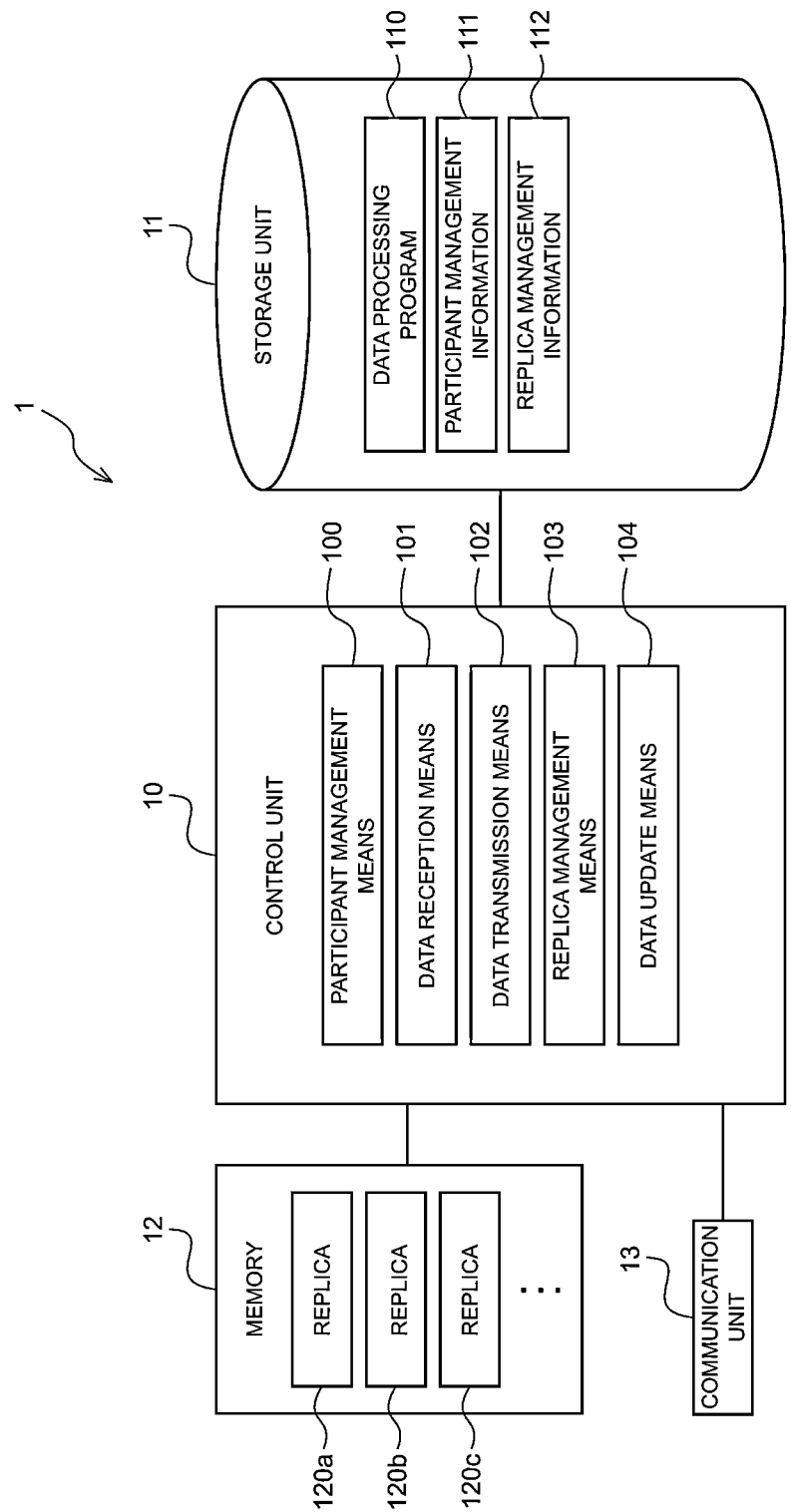
FIG. 2 is a block diagram illustrating an example of a configuration of a server device according to an embodiment.

FIG. 2 is a block diagram illustrating a configuration example of the server device 1 according to the embodiment.

The server device 1 includes a control unit 10 that includes a central processing unit (CPU) and the like, controls each unit, and executes various programs, a storage unit 11 that includes a storage medium such as a flash memory and stores information, a memory 12 that includes a volatile storage medium and temporarily stores information, and a communication unit 13 that communicates with the outside via a network.

The control unit 10 functions as participant management means 100, data reception means 101, data transmission means 102, replica management means 103, data update means 104, and the like by executing a data processing program 110 as a data synchronization program.

The participant management means 100 records, for a participant participating in a common virtual space called a room to which a normal room ID is assigned, a user ID of the participant, a socket ID of a terminal device of the participant, and the like, and stores them in a storage unit 11 as participant management information 111 of the room. In a system that only provides a single virtual space, it may not be necessary to distinguish between rooms, and thus, a room ID may not be necessary.

The data reception means 101 receives and replicates an arbitrary number of (0 or more) objects as data of a synchronization target owned by each of the terminal devices 2*a*, 2*b*, and 2*c* via a communication unit 13, and stores a replica 120*a*, a replica 120*b*, and a replica 120*c* in a memory 12 as replicated objects.

The data transmission means 102 transmits the replica 120*a*, the replica 120*b*, and the replica 120*c* to a terminal determined as a transmission destination based on the participant management information 111 and a transmission rule of replica management information 112 via the communication unit 13.

When the replica 120*a*, the replica 120*b*, and the replica 120*c* are generated, the replica management means 103 records replica IDs of the replica 120*a*, the replica 120*b*, and the replica 120*c*, a user ID of an owner having ownership of the replica of the replica ID, a transmission rule indicating a user for which synchronization is to be performed, and a policy such as permission for transfer, and stores them in the storage unit 11 as the replica management information 112.

In a case where the objects corresponding to the replica 120*a*, the replica 120*b*, and the replica 120*c* are updated, a difference thereof is received from the terminal device of the user having the ownership based on the replica management information 112 by the data reception means 101, and the data update means 104 performs update. Note that it is preferable to receive the difference from the viewpoint of suppressing an information amount of the network, but the updated object itself may be received. Further, the data transmission means 102 transmits the difference to the terminal determined as the transmission destination based on the participant management information 111 and the replica management information 112. Note that it is preferable to transmit the difference from the viewpoint of suppressing an information amount of the network, but the updated object itself may be transmitted.

The storage unit 11 stores the data processing program 110 that causes the control unit 10 to operate as the means 100 to 104 described above, the participant management information 111, the replica management information 112, and the like. A relational database, a file system, or the like is used as the storage unit. Note that, in order to increase the speed, an in-memory database such as Redis may be used or used in combination.

The memory 12 temporarily stores the replicas 120*a*, 120*b*, 120*c*, and the like and other information.

Note that the terminal devices 2*a*, 2*b* and 2*c* each include an operation unit and a display unit in addition to the same configuration as the server device 1. Description is omitted for the common configuration with the server device 1.

FIG. 3 is a diagram illustrating a configuration of the participant management information 111.

The participant management information 111 is created for each room that is a virtual space, and includes a user ID for identifying a participant, a user name of the participant, a socket ID of a socket (TCP socket or UDP socket) including information necessary for transmission and reception of an IP address, a port number, and the like of the terminal device operated by the participant and the server device 1, and a participation date and time indicating a date and time of participation in the room. Furthermore, a role of the participant in the room, a group to which the participant belongs, transmission at the time of updating the shared object, a selection rule for a synchronization target object to be received (a close object or an object in view), a reception format, or a preference thereof (default) may be described.

FIG. 4 is a diagram illustrating a configuration of the replica management information 112.

The replica management information 112 is created for each room that is a virtual space, and includes a replica ID for identifying a replica, an owner indicating a participant ID having ownership of the replica, a transmission rule for transmitting the replica for synchronization, and transfer indicating whether or not the ownership of the replica is transferable. Furthermore, in a case where the transfer can be performed, a rule of the transfer method, a data format in transmission and reception at the time of updating the object, or a preference thereof may be described. Note that the transmission rule may be defined based on performance of a client terminal, a network status of the client terminal, a role of a user having the ownership, and a group to which the user belongs ("group a" in FIG. 3), or may be defined based on criteria such as being close to the object, being in view, or the like ("within distance of 50" in FIG. 3). Alternatively, the transmission rule may be defined based on the performance of the client terminal and the network status of the client terminal.

(Operation of Information Processing Device)

Next, effects of the present embodiment will be described respectively in (1) Basic Operation, (2) Synchronization Operation, and (3) Intermediate Participation/Exit Operation.

(1) Basic Operation

A plurality of users participate in the same virtual space to synchronize a plurality of game objects and share an experience (game play) in the same virtual space (room). For simplicity, an example of a game that provides only a single virtual space will be described. When a user accesses a server in order to participate in the game, the user participates in the only room that always exists regardless of the presence or absence and the number of participating users. In a case where the game uses a plurality of rooms, a room information management function maintains and manages, for each room, the corresponding participant management information 111 and link information (a participant management information ID and a replica management information ID associated with each room) to the replica management information 112. First, the terminal devices 2a, 2b, and 2c execute, for example, a program of a network battle type game, and transmit a participation request for the room to the server device 1 in order to play the game in the common virtual space. Note that the game is progressed by each of the terminal devices 2a, 2b, and 2c, and the server device 1 does not progress the game but performs only the synchronization operation for the objects described later.

Once the participation request for the room is received, the participant management means 100 of the server device 1 records a user ID, a user name, a socket ID, and a participation date and time together in the participant management information 111 associated with the room ID of the storage unit 11.

There are various forms of participation in the room depending on a game design. In a case where the game only provides a single room, all participating users (e.g., logged-in users) join the default room. In a case where the game provides a plurality of rooms, there is also a mode in which a participating user enters a special room called a lobby corresponding to a waiting place (there may be a plurality of lobbies in a case where there is a limitation on the number of participants) and then moves to a target room. Furthermore, in a case where the game provides a plurality of rooms, there is also a mode in which the user returns to the room in which the user previously participated. In a case where a room is newly created, the game may be started by one person, or the game may be started at an appropriate timing after several participants gather. Furthermore, in a case where the game has already been started in the room, participation of a participating user is treated as intermediate participation (see "(3) Intermediate Participation/Exit Operation" to be described later). In the embodiment, the method of participating in the room is not particularly limited. In a case where a plurality of rooms are prepared, a room management table is prepared and managed.

During the play of the game, the terminal devices 2a, 2b, and 2c sequentially generate, update, and delete a plurality of objects (characters, weapons, items, and the like) in accordance with the execution of the program. The server device 1 performs a relay operation for synchronizing the objects in the terminal devices 2a, 2b, and 2c. Hereinafter, for example, the synchronization operation will be described for a case where a new synchronization target object is generated in the terminal device 2a after all the objects of the terminal devices 2a, 2b, and 2c are synchronized during the play of the game.

(2) Synchronization Operation

Figure 5:
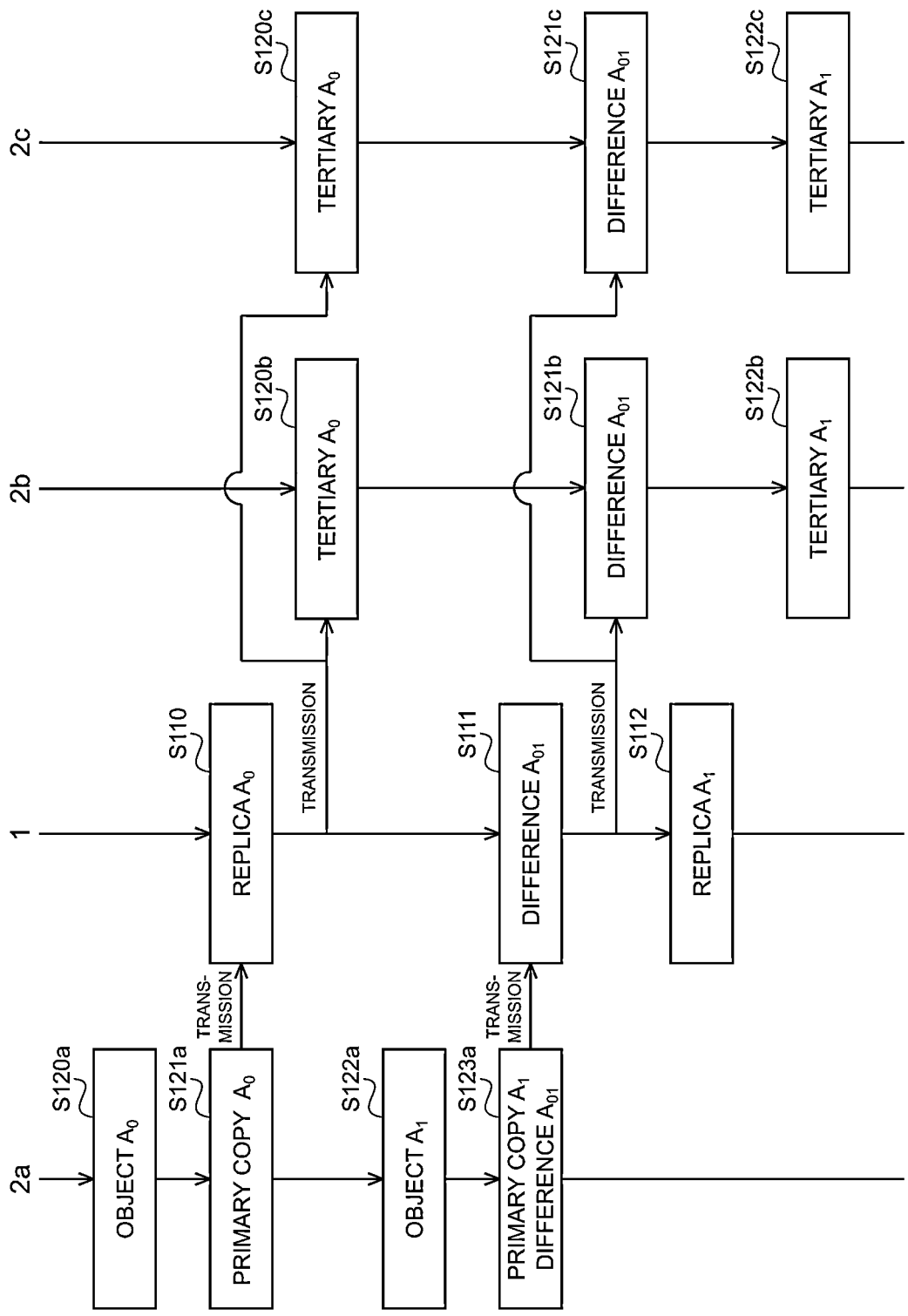
FIG. 5 is a flowchart for describing an example of a synchronization operation.

FIG. 5 is a flowchart for describing an example of the synchronization operation.

First, the terminal device 2a generates an object $A_0$ as a new synchronization target object as the game progresses (S120a). Next, the terminal device 2a generates a primary copy $A_0$ of the object $A_0$ (S121a) and transmits the primary copy $A_0$ to the server device 1. Note that the reason for generating the primary copy is that the object $A_0$ changes over time, and thus the primary copy is generated as data indicating a state of the object at a certain timing (a predetermined synchronization timing, a timing at which a change occurs, or the like) and treated as synchronization information. In addition, another reason for generating the primary copy is that information used in the previous synchronization may be necessary to confirm a difference caused by a change over time in the subsequent synchronization. Meanwhile, depending on the implementation, the object $A_0$ may be directly treated as the synchronization information and transmitted to the server device 1 without creating the primary copy. Alternatively, in particular, for a composite object including a plurality of objects, a combination of both the object and the primary copy may be used. In the following description, the primary copy and the synchronization target object are not strictly distinguished.

The data reception means 101 of the server device 1 receives and replicates a primary copy of an object as data of a synchronization target from the terminal device 2a via the communication unit 13, and stores a replica $A_0$ in the memory 12 as a secondary copy (S110).

When the replica $A_0$ is generated, for example, the replica management means 103 of the server device 1 records a policy such as an owner "U001" of the replica $A_0$ (the user of the terminal device 2a), "a user other than the user of the terminal device 2a" as a transmission destination rule, and whether or not the transfer is "permitted", updates the replica management information 112, and stores the replica management information 112 in the storage unit 11. The policy may be fixedly defined (for example, as a default, the transmission destination is all room participants other than the owner, the transfer is not permitted, and the like) for each type of object, may be designated when the terminal device 2a creates the object, may be designated or changed at any time by the terminal device 2a having the ownership according to the progress of the game, or may be designated in such a way that the replica is temporarily not received by the terminal device 2b as the transmission destination due to a long distance from the terminal device 2a in the virtual space or the like.

Next, the data transmission means 102 of the server device 1 transmits the replica $A_0$ to the terminal devices 2b and 2c (by referring to the participant management information 111 and the like as necessary) of the users defined as the transmission destinations based on the replica management information 112 via the communication unit 14.

The terminal devices 2b and 2c receive and replicate the replica $A_0$ from the server device 1, and store a tertiary $A_0$ as the tertiary copy in the memory (S120b and S120c). The terminal devices 2b and 2c progress the game based on the object synchronized by the tertiary $A_0$. Note that, in a case where a difference of the tertiary is updated in a subsequent step, it is necessary to devise not to directly change the tertiary according to the progress of the game. In a case where a content of the tertiary is changed in motion prediction for reducing interaction and lag according to the progress of the game, the operation is performed in advance with the progress of the game using a copy of the tertiary for the progress of the game. In a case where difference update information is transmitted from the server device 1 later, the copy of the tertiary for the progress of the game is replaced and synchronized with the tertiary to which the difference is applied and updated. When instantaneous replacement is made, in a case where the difference is large or the motion is not smooth, a field value of the copy of the tertiary may be smoothly matched with a field value of the updated tertiary over time, for example, to improve user experience.

Next, the terminal device 2a further changes a field value and the like of the object $A_0$ with the progress of the game to obtain an object $A_1$ (S122a). Next, the terminal device 2a updates the primary copy corresponding to the object $A_1$ (primary copy $A_1$), generates a difference $A_{01}$ from the primary copy $A_0$ corresponding to the object $A_0$ (S123a), and transmits update information of the changed field as the difference $A_{01}$ to the server device 1. Preferably, among all the fields of the synchronization target object, only for a field of which a difference from the previous synchronization information transmission is sufficiently large to exceed a threshold determined in advance according to the game content and which need to be updated to maintain the synchronization state is transmitted, a pair of a field name and a field value and only the number of fields that need to be updated are collectively transmitted as list information. In a case of the number is zero, no transmission is performed, or transmission is performed with zero updates. In addition, in a case where the field name is long, a data serialization technique of coding the field name into a number or the like and compressing the data size may be used.

The data reception means 101 of the server device 1 receives the difference $A_{01}$ from the terminal device 2a via the communication unit 13 (S111), and updates the replica $A_0$ of the memory 12 to a replica $A_1$ by the data update means 104 (S112).

Next, the data transmission means 102 of the server device 1 transmits the difference $A_{01}$ of the replica $A_0$ to the terminal devices 2b and 2c determined as the transmission destinations based on the replica management information 112 via the communication unit 14.

The terminal devices 2b and 2c receive the difference $A_{01}$ from the server device 1 (S121b and S121c), update the tertiary $A_0$ of the memory to a tertiary $A_1$ (S122b and S122c), and progress the game based on the object synchronized by the tertiary $A_1$. The terminal devices 2a, 2b, and 2c assume that the locally stored primary copy and the locally stored tertiary copy indicate the latest state of the synchronization target object, and each of the terminal devices 2a, 2b, and 2c progresses the game while independently performing user operation processing and physical simulation. As a result, in a case where each primary copy is changed, processing corresponding to S422a and S423a is executed, and the difference is repeatedly transmitted to the server device 1.

Note that, in the above operation, a case where the terminal device 2a having the user ID "U001" and having the ownership generates and changes the object $A_0$ has been described. However, deletion can also be performed. In a case where the object $A_0$ has been deleted, the server device 1 is notified of the deletion, and the server device 1 notifies the other terminal devices 2b and 2c of the deletion. In the above operation, a case where the terminal device 2a having the user ID "U001" and having the ownership generates only one object $A_0$ has been described. However, the number of objects generated by each of the terminal devices 2a, 2b, and 2c is not limited, and two or more objects may be generated, or no object may be generated.

In addition, the terminal device 2a suppresses the communication amount by not notifying the server device 1 in a case where there is no change in the object, but may also have a specification in which a notification of the communication amount is made also in a case where there is no change. In addition, in a case where there is a change in the object, the terminal device 2a transmits the difference information to suppress the communication amount. However, in a case where there is a change even in a part of the field, or in a case where there is no change, the terminal device 2a may have a specification in which a notification of the entire object including a field with no change is periodically made. In addition, these specifications may be statically or dynamically switched for each synchronization target object and a notification thereof may be made.

Next, a synchronization rule in a case where the object is updated will be described.

Figure 6:
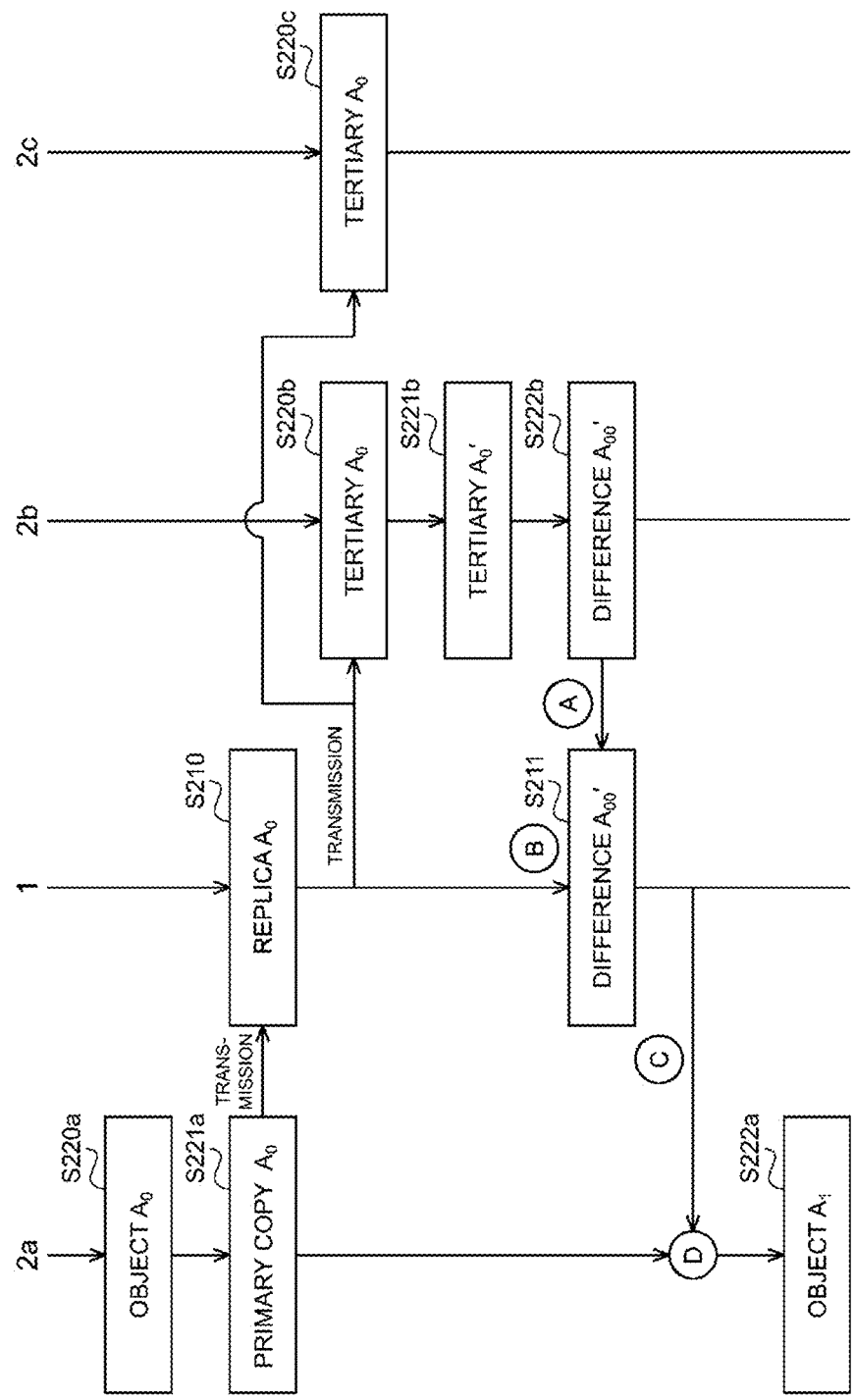
FIG. 6 is a flowchart for describing an example of a synchronization operation based on ownership.

FIG. 6 is a flowchart for describing an example of the synchronization operation based on ownership.

In a case where, in a state in which the object $A_0$ (S220a and S221a) of the terminal device 2a is replicated as the replica $A_0$ by the server device 1 (S210), and the replica $A_0$ is replicated as the tertiary $A_0$ from the server device 1 to the terminal devices 2b and 2c (S220b and S220c), the tertiary $A_0$ is updated with the progress of the game in the terminal device 2b and is changed to a tertiary $A_0'$ (S221b), the ownership of the object $A_0$ that is the original of the tertiary $A_0'$ is defined by the user of the terminal device 2a, and thus, the replica $A_0$ of the server device 1, the object $A_0$ of another terminal device 2a, and the tertiary $A_0$ of the terminal device 2c are not updated by a difference $A_{00'}$ (S222b) between the tertiary $A_0'$ updated by the terminal device 2b and the tertiary $A_0$.

As described above, the prohibition of synchronization by the tertiary $A_0'$ is implemented by any of: (A) the terminal device 2b does not transmit the difference $A_{00'}$ between the tertiary $A_0$ and the tertiary $A_0'$ to the server device 1; (B) the server device 1 does not execute the synchronization processing even when the difference $A_{00'}$ is received (S211) (no update processing is executed for the replica and no transmission processing of update information is executed) (ignore and discard); (C) the server device 1 does not transmit the difference $A_{00'}$ to the terminal device 2a (and the terminal device 2c) without applying the difference $A_{00'}$ to its own replica $A_0$ and updating the difference $A_{00'}$ (C); and (D) the terminal device 2a does not execute the synchronization processing even when the difference $A_{00'}$ is received (no update processing is executed for both of the primary copy and the object). The prohibition of the synchronization based on the object update in a terminal device other than the terminal device of the user having the ownership may be implemented by any method of A to D, or any combination of one or more of them. However, by adopting A of A to D, the amount of information transmitted and received through the network communication becomes the smallest, and the amount of information transmitted and received through the network communication increases in the order of B, C, and D. Therefore, the desirableness of the configuration increases from A to D. In addition, since server verification is usually performed in order to prevent fraud (cheat) in the game, a combination of A and B is a preferable minimum configuration.

(3) Intermediate Participation/Exit Operation

Next, a case where the terminal device 2a participates in the middle will be described. It is assumed that the terminal device 2b generates an object $B_0$, the user of the terminal device 2b has ownership of the object $B_0$, the terminal device 2c generates an object $C_0$, and the user of the terminal device 2c has ownership of the object $C_0$.

Figure 7:
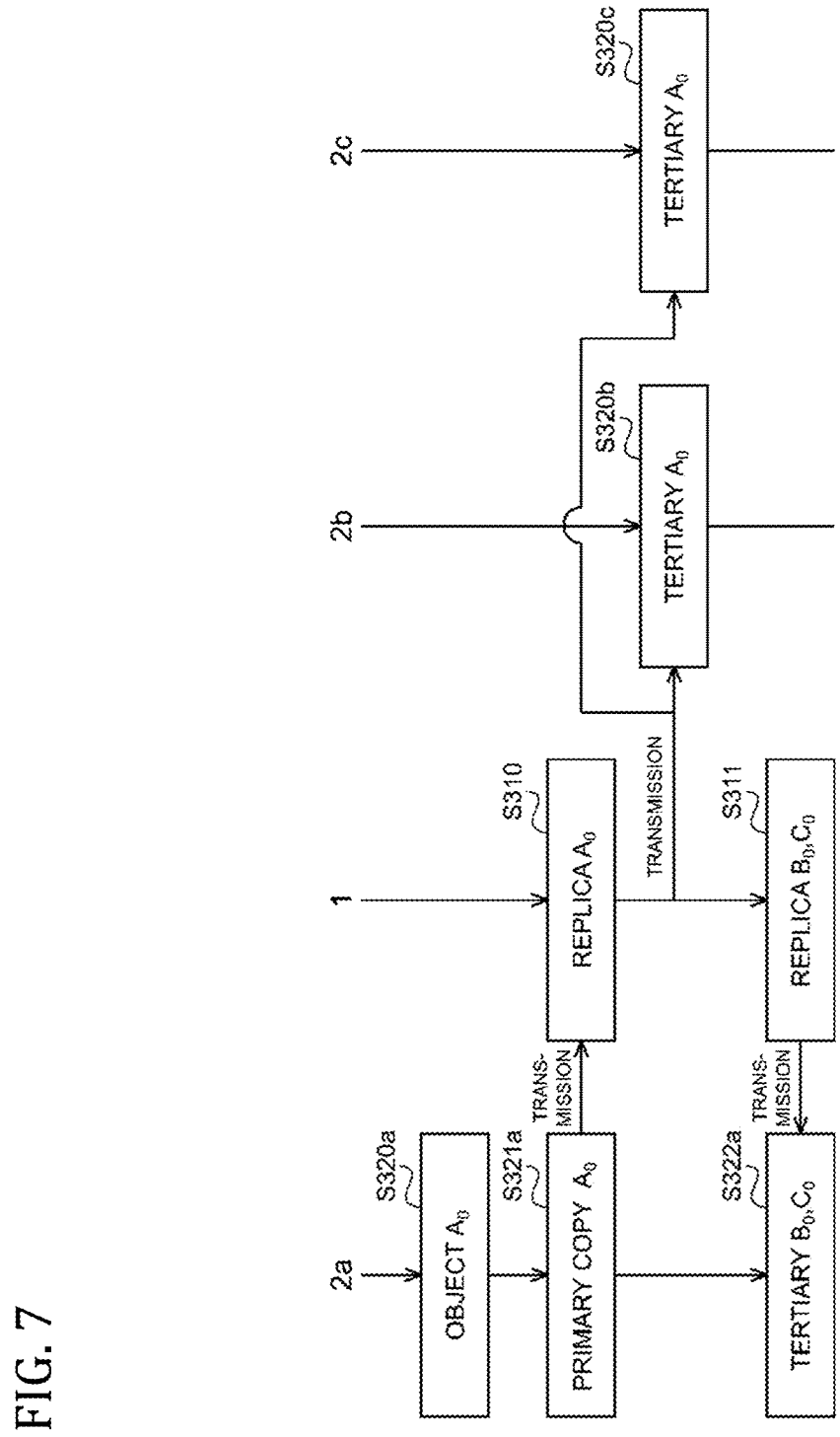
FIG. 7 is a flowchart for describing an example of a synchronization operation for intermediate participation.

FIG. 7 is a flowchart for describing an example of a synchronization operation for the intermediate participation.

First, the terminal device 2a first participates in the room. The server device 1 adds information of the user U001 associated with the terminal device 2a to the participant management information 111. Furthermore, the terminal device 2a participates in the middle and generates, for example, a new character as a new object $A_0$ (S320a). Next, the terminal device 2a generates a primary copy of the object $A_0$ (S321 a) and transmits the primary copy to the server device 1.

The data reception means 101 of the server device 1 receives and replicates the primary copy of the object as data of a synchronization target from the terminal device 2a via the communication unit 13, and stores the replica $A_0$ in the memory 12 as a secondary copy (S310).

When the replica $A_0$ is generated, for example, the replica management means 103 of the server device 1 records a policy such as an owner "U001" of the replica $A_0$ (the user of the terminal device 2a), "a user other than the user of the terminal device 2a" as a transmission destination rule, and whether or not the transfer is "permitted", updates the replica management information 112, and stores the replica management information 112 in the storage unit 11.

Next, the data transmission means 102 of the server device 1 transmits the replica $A_0$ to the terminal devices 2b and 2c determined as the transmission destinations based on the replica management information 112 via the communication unit 14.

The terminal devices 2b and 2c receive and replicate the replica $A_0$ from the server device 1, and store a tertiary $A_0$ as the tertiary copy in the memory (S320b and S320c).

In addition, since the data transmission means 102 of the server device 1 manages the replicas of the objects owned by the users of the other terminal devices 2b and 2c in advance (S311), the data transmission means 102 transmits the replicas $B_0$ and $C_0$ to the terminal device 2a determined as a transmission destination based on the replica management information 112 via the communication unit 14. Note that the transmission may be performed before the synchronization operation of the object $A_0$.

The terminal device 2a receives and replicates the replicas $B_0$ and $C_0$ from the server device 1, and stores tertiaries $B_0$ and $C_0$ in the memory as tertiary copies (S322a). Through the series of operations, the terminal device 2a communicates only with the server device 1 without communicating with the terminal devices 2b and 2c, and the participation operation is completed. Here, the number of already participating terminals is two, but even in a case where 1000 terminals already participate, the participation of the terminal device 2a can be completed by communicating only with the server device 1, and the 1000 already participating terminals do not need to notify the terminal device 2a of the synchronization target objects owned by the terminals, and the loads of the network and each terminal device due to the participation of the terminal device 2a in the middle are small.

Next, a case where the terminal device 2a exits in the middle will be described.

Figure 8:
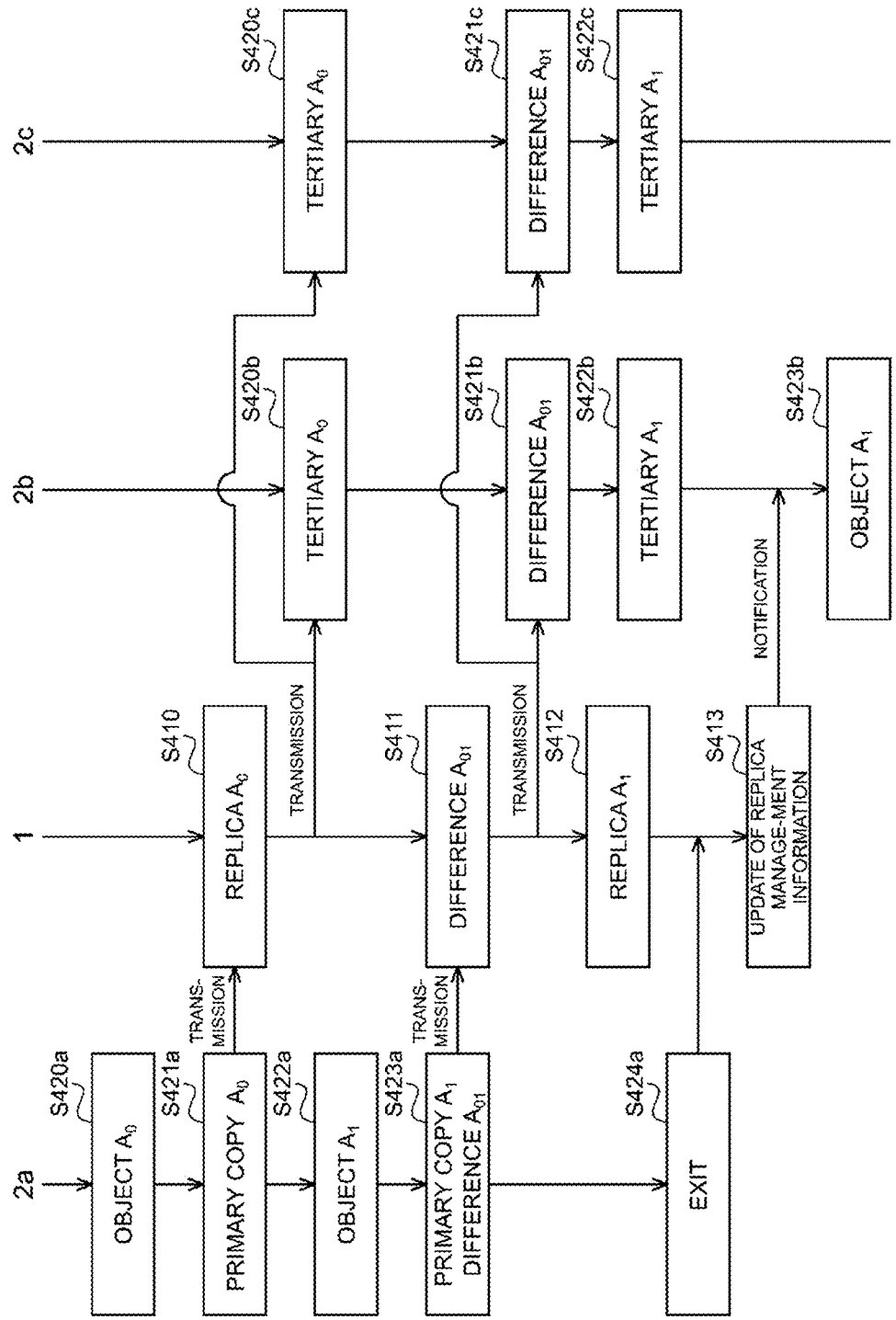
FIG. 8 is a flowchart for describing an example of a synchronization operation for intermediate exit.

FIG. 8 is a flowchart for describing an example of a synchronization operation for intermediate exit.

It is assumed that the terminal device 2a generates an object $A_0$ (S420a), updates the object $A_0$ to be an object $A_1$ (S422a), and exits after tertiaries $A_0$ and $A_1$ are synchronized with the terminal devices 2b and 2c, respectively (S422b and S422c) (S424a). First, as illustrated in FIG. 4, a case where a transfer item of a replica ID "A" of the replica management information 112 indicates "permitted" will be described. Here, examples of the object for which the transfer item indicates "permitted" include items used in a game, and the like, and may further include a character (non playing character (NPC)) or an enemy.

The terminal device 2a makes an exit request to the server device 1. The participant management means 100 of the server device 1 deletes user information associated with the terminal device 2a from the participant management information 111. Further, the replica management means 103 of the server device 1 checks the transfer item of the replica management information 112, and in a case where the transfer item indicates "permitted", the replica management means 103 changes the owner to the user of the terminal device 2b, updates the content of the replica management information 112 (S413), and notifies the terminal device 2b of the fact that the ownership has been changed.

When the terminal device 2b receives, from the server device 1, a notification indicating that the ownership has been changed to the terminal device 2b, the terminal device 2b changes the stored tertiary $A_1$ to the object $A_1$ owned by the terminal device 2b (S423b), whereby the exit operation is completed. Here, the terminal device 2a explicitly notifies the server device 1 of the exit (S424 a), but a notification of the exit cannot be made due to sudden disconnection or the like in some cases. Even in this case, in a case where the terminal device 2a detects disconnection (for example, the socket is closed), server device 1 can complete the processing of exiting and changing the ownership similarly to the case where the exit notification is explicitly received.

Note that, in a case where the transfer item indicates "permitted", a transfer target user may be determined in advance or may be determined at the time of exit. Alternatively, the transfer may be performed in order of date and time of participation, the transfer target user may be randomly determined, a user of a terminal with a high processing capability may be allocated as the transfer target user, or a user of a terminal with a good network environment (high bandwidth, low latency/round-trip time (RTT), stable communication (RTT is stable and small)) may be allocated as the transfer target user.

Next, a case where the transfer item of the replica ID "A" of the replica management information 112 indicates "not permitted" will be described. Here, examples of the object for which the transfer item indicates "not permitted" include a character (user's own avatar) played in the game and an enemy, and may further include an item used in the game.

Figure 9:
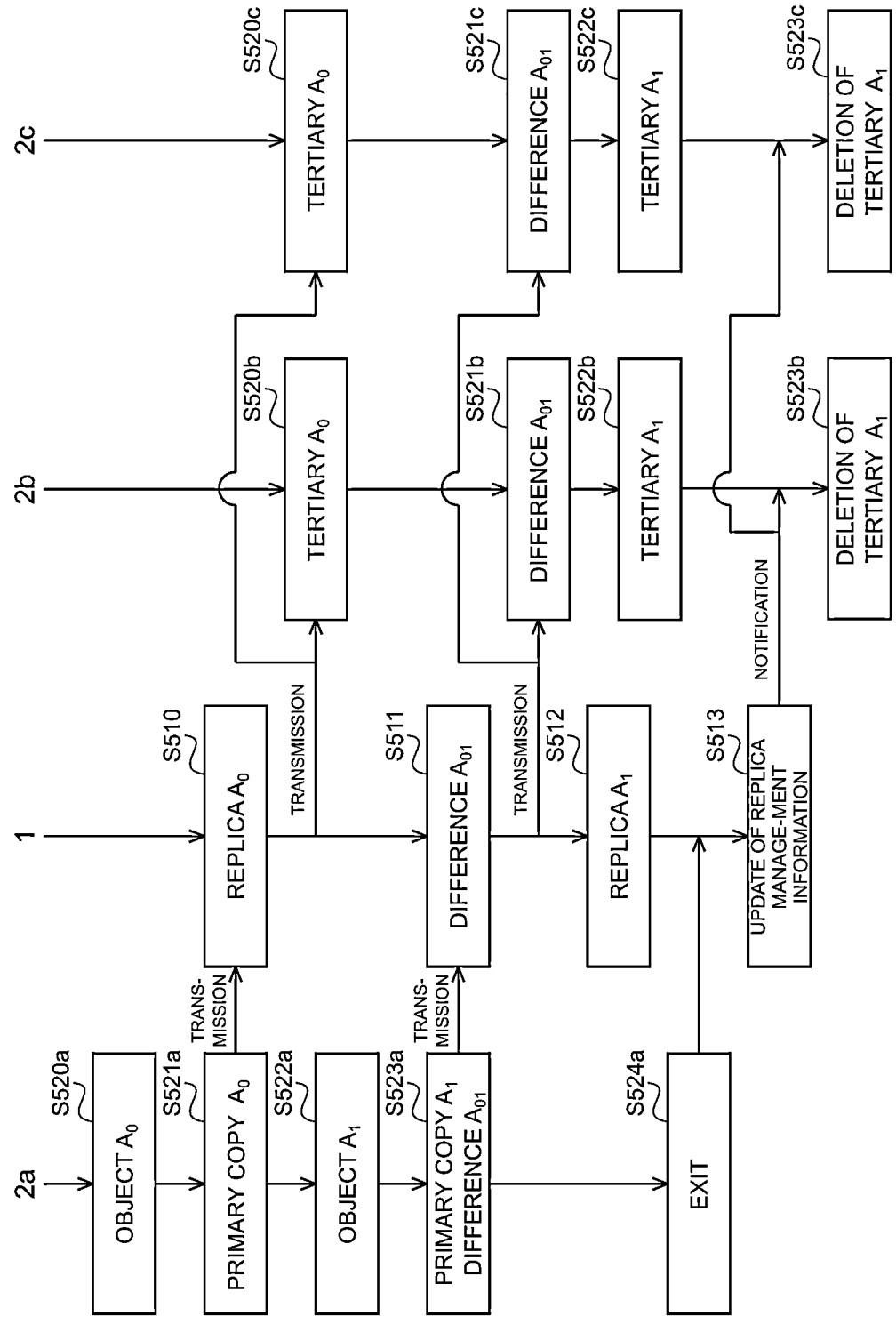
FIG. 9 is a flowchart for describing another example of the synchronization operation for the intermediate exit.

FIG. 9 is a flowchart for describing another example of the synchronization operation for the intermediate exit.

The terminal device 2a makes a request for exist (S524a) to the server device 1. The server device 1 checks the transfer item of the replica management information 112, and in a case where the transfer item indicates "not permitted", the server device 1 deletes information regarding the replica $A_1$, updates the contents of the participant management information 111 and the replica management information 112 (deletes the user information associated with the terminal device 2a and delete the synchronization target object owned by the user associated with the terminal device 2a) (S513), and notifies the terminal devices 2b and 2c that the replica $A_1$ has been deleted.

Upon receiving the notification that the replica $A_1$ has been deleted from the server device 1, the terminal devices 2b and 2c delete the stored tertiary $A_1$ (S523b and S523c), whereby the exit operation is completed.

Effects of Embodiment

According to the above-described embodiment, since the terminal device 2a does not receive synchronization target objects from all the other terminal devices 2b and 2c, the server device 1 stores replicas of objects generated by all the terminal devices, and the terminal device 2a receives a synchronization target object from the server device 1, it is possible to suppress an increase in communication load in a configuration in which a plurality of terminal devices participate and data of a plurality of terminal devices is synchronized. In addition, since the server device 1 does not progress the game, the processing load can be reduced. As a result, object synchronization for a game in which about 1000 participants participate becomes possible.

In addition, since it is sufficient if a replica is received from the server and a tertiary is created for the intermediate participation, there is no need to receive an object from another client, and an increase in communication load and processing load can be suppressed.

Other Embodiments

The present invention is not limited to the above embodiments, and various modifications can be made without departing from the gist of the present invention.

Note that, in the above-described embodiments, since the object updated by the user having the ownership updates the replica of the server device 1 and the update information is propagated to the remaining clients in the same room, conflict resolution in the progress of the game is conflict resolution prioritized for the owner client, but equality for the avatar in the game can be realized as long as it is a game design owned by each client itself. The conflict between the owner clients is resolved by the design of the game. For example, it is sufficient if design is made in such a way that there is no direct correlation, or design is made in such a way that there is no direct correlation between synchronization target objects by having a correlation via another mechanism such as a remote procedure call (RPC) or another object.

In addition, in the above-described embodiments, since the existing technology can be applied to the method of progressing the game while performing synchronization between clients, the details are omitted. In particular, in a virtual environment in which a large number of people from all over the world participate, there is a possibility that a delay or a loss occurs in transmission of information regarding the synchronization target object. Therefore, for transmission of the information, it is necessary to devise various general methods in addition to the method proposed by the present invention in accordance with the type of the virtual space (the genre of the game) and the type of the synchronization target object.

First, in order to deal with the network delay, each client often synchronizes a virtual space time in a virtual space in which the client participates, and attaches the virtual space time to communication information regarding the synchronization target object.

In order to deal with the network delay, a synchronization method that causes a shift in the progress of the game for each client participating in the virtual space is widely used. That is, the terminal devices 2a, 2b, and 2c progress the game independently in the virtual space, but times in the virtual space in which the terminal devices 2a, 2b, and 2c are progressing the game do not slightly coincide with each other. In a case where the terminal device 2a and the terminal device 2b can be viewed side by side, the virtual space time of the terminal device 2a is slightly delayed with respect to the virtual space time of the terminal device 2b (after a certain event occurs in the terminal device 2b, the event also occurs in the terminal device 2a). This is particularly noticeable when the terminal device 2a and the terminal device 2b are installed geographically away from each other, and when there is a large difference in distance between each of the terminal device 2a and the terminal device 2b and the server device 1 (for example, a case where the server device 1, the virtual device 2a, and the terminal device 2b exist in Tokyo, Osaka, and New York, respectively).

In addition, retransmission may be performed according to a communication protocol in order to deal with a network loss. The retransmission further delays transmission of information regarding the synchronization target object.

Furthermore, in order to reduce the transmission frequency of the information regarding the synchronization target object, not only the processing based on the threshold described above but also the transmission frequency is widely limited. In a case where the progress of the game in the virtual space is managed by a frame (sampling a game state at appropriate time intervals and synchronizing at a frequency of sampling), the primary copy is updated at a frame rate (for example, 20 times per second). It may be combined with update control using a threshold. The frame management means that each terminal device performs synchronization at each frame time common to the virtual space. More specifically, the primary copy is updated (a condition such as a threshold is also considered as necessary) in each client for each specific common virtual space time in the virtual space, and a frame time of the frame (the virtual space time or a serial number of the frame) is attached at the update timing and transmitted to the information processing device 1 as update information (a difference or all). Meanwhile, each terminal device receives the update information of the primary copy of another terminal together with the frame time at the time of each update. The frame time attached to the update information of another terminal received by the terminal device coincides with a frame time of the latest primary copy in a state where there is no delay. In a state where there is a delay, the frame time attached to the update information received by the terminal device varies depending on the terminal device that owns each object due to various reasons such as a location of the terminal device, a network environment, or a temporary change in a communication state, and is generally earlier than the frame time of the primary copy of the terminal itself. When the game is simply progressed based on the primary copy and the tertiary copy at different frame times, the synchronization deviation between the terminals may increase. In such a case, for example, it is also possible to first measure a difference in frame time received from each terminal in advance and progress the game in accordance with the frame time of the terminal that transmits the latest frame time on average. In that case, update information for several frames is buffered by the terminal device, and those at the same frame time are combined to strictly progress the game. However, when the lag is 0.1 seconds or more (a delay of two frames or more in a case of 20 frames per second), the user experience is deteriorated although it depends on the game genre. Although further details are omitted, a method adapted to the game genre is adopted using various compromise plans. In a mobile terminal or the like, a delay of a frame dynamically changes greatly, and thus, another measure is also required.

Alternatively, the virtual space time information in the virtual space may be attached according to a characteristic of a communication path. In a case where a reliable communication protocol such as TCP/IP or reliable UDP (RUDP) is used, a virtual space time order of received update information of a shared object is not changed. On the other hand, in a case where the entire synchronization target object is transmitted every time, a communication loss is assumed using a protocol such as UDP that does not guarantee reliability, and the entire synchronization target object is transmitted as the update information, the arrived update information may be partially lost, or arrival of the update information may not be in the order of the virtual space time attached to the primary copy, but may occur before or after the virtual space time. In such a case, the terminal device progress the game by synchronizing the object by replacing the received information using the virtual space time attached to the update information or discarding unnecessary old information when old update information is received.

Furthermore, the participant management information 111 may manage links to the participant objects as a list in the order of participation. The server device 1 may perform communication with the terminal devices 2a, 2b, and 2c by acquiring information necessary for corresponding communication from the participant information of each link.

In the above embodiment, the functions of the means 100 to 104 of the control unit 10 are implemented by the program, but all or a part of the means may be implemented by hardware such as an ASIC. In addition, the program employed in the above embodiment can be provided in a state of being stored in a recording medium such as a CD-ROM. Furthermore, replacement, deletion, addition, and the like of the steps described in the above embodiment can be made within such a scope that the gist of the present invention is not changed. In addition, the function of each means may be appropriately coupled to another means or may be separated into a plurality of means.

INDUSTRIAL APPLICABILITY

Provided are an information processing device, a data synchronization program, a data synchronization method, a data synchronization system, and a terminal device that suppress an increase in processing load and communication load in a situation in which a plurality of user terminals participate and data of the plurality of user terminals are synchronized.

REFERENCE SIGNS LIST

1 Server device
2 Terminal device
4 Network
10 Control unit
11 Storage unit
12 Memory
13 Communication unit
100 Participant management means
101 Data reception means
102 Data transmission means
103 Replica management means
104 Data update means
110 Data processing program
111 Participant management information
112 Replica management information

The invention claimed is:

1. An information processing device comprising:
a non-transitory computer-readable medium containing executable instructions which when executed by one or more processors of a computer, causes the computer to:
receive changed content information of a synchronization target object from a plurality of clients connected to the information processing device via network;
update, by referring to management information that is managed for each synchronization target object and defines a first client of the plurality of clients having an ownership of the synchronization target object in the management information, a replicated object obtained by replicating the synchronization target object of the first client of the plurality of clients by using the changed content information in a case where a transmission source client of the plurality of clients is defined as the first client of the plurality of clients; and
instruct to a transmitter to transmit the changed content information to a second client other than the first client among the plurality of clients.

2. The information processing device according to claim 1, wherein in response to a participation of the first client of the plurality of clients in a virtual space in which the plurality of clients participate, execution of the instructions to receive the changed content information comprises receiving the synchronization target object owned by the first client of the plurality of clients and storing the synchronization target object as the replicated object in a recording medium.

3. The information processing device according to claim 1, wherein in response to a generation of a new object by the first client of the plurality of clients, execution of the instructions to receive the changed content information comprises replicating the newly generated object as the synchronization target object and storing the replicated object in a recording medium.

4. The information processing device according to claim 2, wherein in response to a participation of the first client of the plurality of clients,
or in response to a generation of a new object by the first client of the plurality of clients, execution of the instructions to transmit the changed content information comprises instructing a transmitter to transmit the replicated object or the synchronization target object stored in a recording medium to a second client other than the first client among the plurality of clients.

5. The information processing device according to claim 1, wherein execution of the instructions to receive the changed content information comprises ignoring the changed content information of the synchronization target object from the second client of the plurality of clients other than the first client of the plurality of clients.

6. The information processing device according to claim 1, wherein execution of the instructions to update the changed content information comprises not updating the replicated object in a case where execution of the instructions to receive the changed content information comprises receiving the changed content information of the synchronization target object from the second client of the plurality of clients other than the first client of the plurality of clients.

7. The information processing device according to claim 1, wherein in a case where execution of the instructions to receive the changed content information comprises receiving the changed content information of the synchronization target object from the second client of the plurality of clients other than the first client of the plurality of clients, the execution of the instructions to transmit the changed content information comprises instructing to a transmitter not to transmit the changed content information to the first client of the plurality of clients.

8. The information processing device according to claim 1, wherein execution of the instructions to update the changed content information comprises receiving a difference of the synchronization target object before change and the synchronization target object after change as the changed content information of the synchronization target object and updating the replicated object.

9. The information processing device according to claim 1, execution of the instructions to further transfer the ownership of the replicated object corresponding to the synchronization target object owned by the first client of the plurality of clients to the third client of the plurality of clients based on a predetermined rule in a case where the transfer of the ownership is permitted when the first client of the plurality of clients exits from the virtual space in which the plurality of clients participate.

10. The information processing device according to claim 1, execution of the instructions to further delete the replicated object in a case where transfer of the ownership of the replicated object corresponding to the synchronization target object owned by the first client of the plurality of clients is not permitted when the first client of the plurality of clients exits from the virtual space in which the first client of the plurality of clients participates,
wherein the execution of the instructions to transmit the changed content information comprises instructing a third client of the plurality of clients to delete an object corresponding to the replicated object held by the third client of the plurality of clients.

11. An information processing device comprising:
a non-transitory computer-readable medium containing executable instructions which when executed by one or more processors of a computer, causes the computer to:
receive changed content information of a synchronization target object from a plurality of clients connected to the information processing device via network;
update a replicated object obtained by replicating the synchronization target object of a first client of the plurality of the clients having an ownership of the synchronization target object by using the changed content information; and
instruct to a transmitter to transmit, by referring to management information that is managed for each synchronization target object and defines the first client of the plurality of clients having the ownership of the synchronization target object, the changed content information to a second client among the plurality of clients in a case where a transmission source client of the plurality of clients is defined as the first client.

12. A non-transitory computer-readable medium containing executable instructions which when executed by one or more processors of a computer connected to a plurality of clients that synchronize an object with each other via a network, causes the computer to perform operations comprising:
receiving changed content information of a synchronization target object from the plurality of clients;
updating, by referring to management information that is managed for each synchronization target object and defines a first client of the plurality of clients having an ownership of the synchronization target object, a replicated object obtained by replicating the synchronization target object of the first client by using the changed content information in a case where a transmission source client is defined as the first client of the plurality of clients having the ownership of the synchronization target object in the management information; and
instructing to a transmitter to transmit the changed content information to a second client of the plurality of clients other than the first client among the plurality of clients.

13. A non-transitory computer-readable medium containing executable instructions which when executed by one or more processors of a computer connected to a plurality of clients that synchronize an object with each other via a network, causes the computer to perform operations comprising:
receiving changed content information of a synchronization target object from the plurality of clients;
updating a replicated object obtained by replicating the synchronization target object of a first client of the plurality of clients having an ownership of the synchronization target object by using the changed content information; and
instructing to a transmitter to transmit, by referring to management information that is managed for each synchronization target object and defines the first client of the plurality of clients having the ownership of the synchronization target object, the changed content information to the second client of the plurality of clients other than the first client among the plurality of clients in a case where a transmission source client of the plurality of clients is defined as the first client of the plurality of clients.

14. A data synchronization method performed by an information processing device connected to a plurality of clients that synchronize an object with each other via a network, the data synchronization method comprising:
receiving changed content information of a synchronization target object from the plurality of clients;
defining a transmission source client of the plurality of clients as a first client having an ownership of the synchronization target object, by referring to management information that manages ownerships of each of the plurality of clients to each of synchronization target objects,
updating a replicated synchronization target object obtained by replicating the synchronization target object of the first client of the plurality of clients by using the changed content information; and
instructing to a transmitter to transmit the changed content information to a second client other than the first client among the plurality of clients.

15. A data synchronization method performed by an information processing device connected to a plurality of clients that synchronize an object with each other via a network, the data synchronization method comprising:
receiving changed content information of a synchronization target object from the plurality of clients;
updating a replicated object obtained by replicating the synchronization target object of a first client of the plurality of clients having an ownership of the synchronization target object by using the changed content information; and instructing to a transmitter to transmit, by referring to management information that is managed for each synchronization target object and defines the first client of the plurality of clients, the changed content information to a second client other than the first client among the plurality of clients in a case where a transmission source client of the plurality of clients is defined as the first client of the plurality of clients.

16. A data synchronization system comprising:

a plurality of clients that synchronize an object with each other; and an information processing device that is connected to the plurality of clients via a network and includes:

a non-transitory computer-readable medium containing executable instructions which when executed by one or more processors of a computer, causes the computer to:

receive changed content information of a synchronization target object from the plurality of clients;

update, by referring to management information that is managed for each synchronization target object and defines a first client of the plurality of clients having an ownership of the synchronization target object, a replicated object obtained by replicating the synchronization target object of the first client of the plurality of clients by using the changed content information in a case where a transmission source client of the plurality of clients is defined as the first client of the plurality of clients; and instructing to a transmitter to transmit the changed content information to a second client other than the first client among the plurality of clients.

17. The data synchronization system according to claim 16, wherein the plurality of clients transmit, to the information processing device, a difference of the synchronization target object before change and the synchronization target object after change as the changed content information of the synchronization target object.

18. A data synchronization system comprising:

a plurality of clients that synchronize an object with each other; and an information processing device that is connected to the plurality of clients via a network and includes:

a non-transitory computer-readable medium containing executable instructions which when executed by one or more processors of a computer, causes the computer to:

receive changed content information of a synchronization target object from the plurality of clients;

update a replicated object obtained by replicating the synchronization target object of a first client of the plurality of clients having an ownership of the synchronization target object by using the changed content information; and instructing to a transmitter to transmit, by referring to management information that is managed for each synchronization target object and defines the first client the plurality of clients, the changed content information to a second client other than the first client among the plurality of clients in a case where a transmission source client is defined as the first client of the plurality of clients.

19. A terminal device comprising:

a first client that synchronizes an object with a second client via an information processing device and is communicably connected to the information processing device; and a non-transitory computer-readable medium containing executable instructions which when executed by one or more processors of clients, causes a system to:

transmit, by referring to management information that is managed for each synchronization target object and defines the first client having an ownership of the synchronization target object, changed content information, which is information indicating that a replicated object obtained by replicating the synchronization target object is updated in the own client, to the information processing device only in a case where the own client is defined as the first client, when the replicated object obtained by replicating the synchronization target object is updated in the own client.

20. The terminal device as a client according to claim 19, wherein a difference of the synchronization target object before change and the synchronization target object after change is transmitted to the information processing device as the changed content information of the synchronization target object.

\* \* \* \* \*